United States Patent
Scheidell

(10) Patent No.: US 7,603,711 B2
(45) Date of Patent: Oct. 13, 2009

(54) INTRUSION DETECTION SYSTEM

(75) Inventor: Michael Scheidell, Boca Raton, FL (US)

(73) Assignee: Secnap Networks Security, LLC, Boca Raton, FL (US)

( * ) Notice: Subject to any disclaimer, the term of this patent is extended or adjusted under 35 U.S.C. 154(b) by 961 days.

(21) Appl. No.: 10/699,005

(22) Filed: Oct. 30, 2003

(65) Prior Publication Data

US 2004/0098623 A1      May 20, 2004

(51) Int. Cl.
*G06F 21/00* (2006.01)
*G06F 11/30* (2006.01)
*G06F 15/16* (2006.01)

(52) U.S. Cl. .................................. 726/24; 726/11
(58) Field of Classification Search ...................... None
See application file for complete search history.

(56) References Cited

U.S. PATENT DOCUMENTS

| | | | |
|---|---|---|---|
| 5,621,889 A | 4/1997 | Lermuzeaux et al. | |
| 5,878,420 A | 3/1999 | de la Salle | |
| 5,898,830 A | 4/1999 | Wesinger, Jr. et al. | |
| 5,919,258 A | 7/1999 | Kayashima et al. | |
| 5,991,881 A | 11/1999 | Conklin et al. | |
| 6,119,236 A * | 9/2000 | Shipley | 726/22 |
| 6,279,113 B1 | 8/2001 | Vaidya | |
| 6,304,975 B1 * | 10/2001 | Shipley | 726/22 |
| 6,453,345 B2 | 9/2002 | Trcka et al. | |
| 6,519,703 B1 * | 2/2003 | Joyce | 726/22 |
| 6,578,147 B1 | 6/2003 | Shanklin et al. | |
| 6,611,869 B1 | 8/2003 | Eschelbeck et al. | |
| 6,952,779 B1 * | 10/2005 | Cohen et al. | 726/22 |
| 6,971,028 B1 * | 11/2005 | Lyle et al. | 726/25 |
| 6,988,208 B2 * | 1/2006 | Hrabik et al. | 726/23 |
| 7,076,803 B2 * | 7/2006 | Bruton et al. | 726/23 |
| 7,222,366 B2 * | 5/2007 | Bruton et al. | 726/23 |
| 7,325,252 B2 * | 1/2008 | Bunker et al. | 726/25 |
| 2002/0023227 A1 | 2/2002 | Sheymov et al. | |
| 2002/0046275 A1 * | 4/2002 | Crosbie et al. | 709/224 |
| 2002/0166063 A1 * | 11/2002 | Lachman et al. | 713/200 |

(Continued)

FOREIGN PATENT DOCUMENTS

GB      2 362 076      11/2001

(Continued)

OTHER PUBLICATIONS

Watson, Peter, "An Approach to IDS," SANS Institute Resources (2002), http://www.sans.org.newlook/resources/IDFAQ/layered_defense.htm.

(Continued)

*Primary Examiner*—Christopher A Revak
(74) *Attorney, Agent, or Firm*—Steven M. Greenberg, Esq.; Carey, Rodriguez, Greenberg & Paul, LLP

(57) ABSTRACT

An intrusion detection system monitors the rate and characteristics of Internet attacks on a computer network and filters attack alerts based upon various rates and frequencies of the attacks. The intrusion detection system monitors attacks on other hosts and determines if the attacks are random or general attacks or attacks directed towards a specific computer network and generates a corresponding signal. The intrusion detections system also tests a computer network's vulnerability to attacks detected on the other monitored hosts.

4 Claims, 4 Drawing Sheets

U.S. PATENT DOCUMENTS

| | | | |
|---|---|---|---|
| 2002/0178383 A1* | 11/2002 | Hrabik et al. | 713/201 |
| 2003/0009696 A1* | 1/2003 | Bunker et al. | 713/201 |
| 2003/0051026 A1* | 3/2003 | Carter et al. | 709/224 |
| 2003/0084349 A1* | 5/2003 | Friedrichs et al. | 713/201 |
| 2003/0093514 A1* | 5/2003 | Valdes et al. | 709/224 |
| 2003/0188194 A1* | 10/2003 | Currie et al. | 713/201 |
| 2004/0117658 A1* | 6/2004 | Klaes | 713/201 |
| 2005/0005017 A1* | 1/2005 | Ptacek et al. | 709/229 |
| 2007/0226803 A1* | 9/2007 | Kim et al. | 726/24 |
| 2008/0263661 A1* | 10/2008 | Bouzida | 726/22 |
| 2009/0077663 A1* | 3/2009 | Sun et al. | 726/23 |

FOREIGN PATENT DOCUMENTS

WO      WO 01/31421      5/2001

OTHER PUBLICATIONS

Reeder, Paul, "Intrusion Detection: Adding Depth to Network Defense," Networking News & Analysis (Apr. 25, 2001).

Phung, Manh, "Data Mining in Intrusion Detection," SANS Institute (Oct. 24, 2000).

International Search Report dated Sep. 29, 2004 for PCT/US03/34766.

Partial European Search Report for International Application No. PCT/US03/34766, dated Jul. 29, 2004.

* cited by examiner

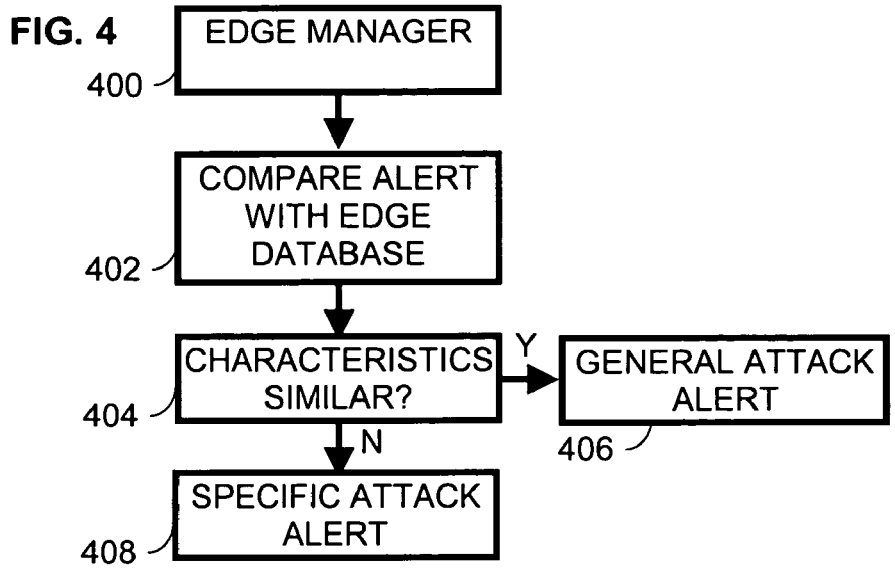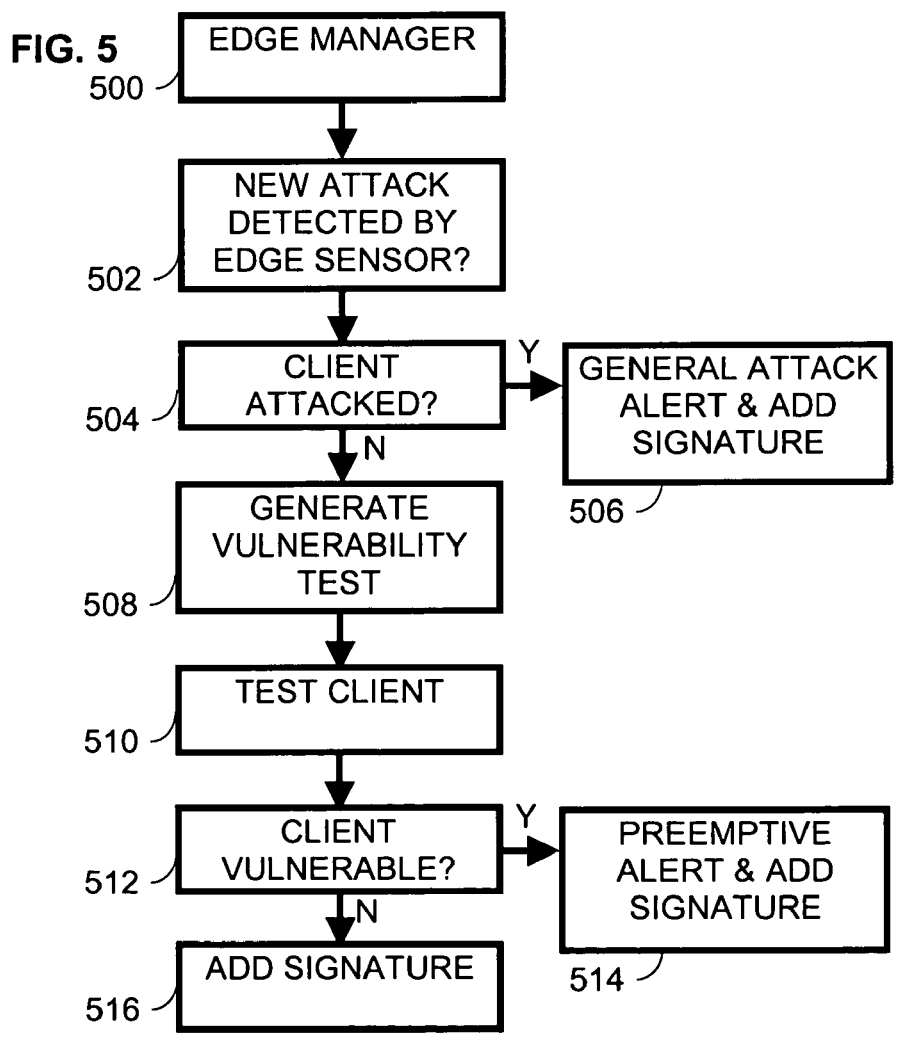

INTRUSION DETECTION SYSTEM

FIELD OF THE INVENTION

The present invention relates to computer networks. More particularly, the present invention relates to network security systems for detecting and protecting against security breaches.

BACKGROUND

A significant problem in the field of computer networks has been the inability to adequately protect private Internet-connected computer networks from security attacks. This problem commonly arises, for example when a company interconnects its internal network (typically a local area network) with the Internet to allow company employees to more easily communicate with outside entities. The benefits of connecting the internal network to the Internet are often significant, including, for example, enabling the company to inexpensively disseminate product information and provide online customer support to potential and existing customers.

As many companies have discovered, however, connecting the internal network to the Internet can have devastating consequences in the absence of an adequate security mechanism. A break-in by a hacker, for example, will often result in the deletion of important data or software files, the introduction of a virus to the network, and/or the public dissemination of confidential information. Less overt break-ins may involve the secret misappropriation of company trade secrets, or the covert manipulation of company data files. Even an innocent act by a company employee, such as the downloading of a virus-ridden file from a Web site, can have devastating effects.

One type of security system which provides limited protection against intrusions is a network firewall system ("firewall"). A firewall is a computer system that restricts the flow of traffic between two networks based on a pre-programmed access control policy. A common misconception is that a firewall will secure the computer facilities and additional steps don't need to be taken. A firewall is just one component of an effective security model. Additional components or layers should be added to provide an effective security model within an organization. A security model that protects an organization includes the following layers:
1. Security policy of the organization
2. Host system security
3. Auditing
4. Router security
5. Firewalls
6. Intrusion detection systems (IDS)
7. Incident response plan Using multiple layers in a security model is an effective method of deterring unauthorized use of computer systems and network services. Every layer provides some protection from intrusion, and the defeat of one layer may not lead to the compromise of your whole organization. Each layer has some inter-dependence on other layers. For example, the Intrusion Detection Systems (IDS) and the incident response plan have some interdependencies. Although they can be implemented independently, it's preferable when they're implemented together. Having an IDS that can alert unauthorized attempts on a system dovetails well with an incident response plan that deals with problems.

Intrusion detection follows a simple premise: every network resource and user develops and displays a pattern of normal usage—one that is specific and possibly unique to that item. Though anomalies in network usage sometimes appear, they should be explainable. Anything that cannot be readily explained should be considered a probable attack and investigated. Intrusion detection systems automate much of this process.

A typical IDS consists of several components:
  An algorithm construction component defines rules by which network users should be operating
  A log-generating application records network usage (other products provide this, but we'll talk about the specific IDS application in a moment)
  An automated tool reviews, catalogs, and searches logs
  The interface allows an administrator to integrate and manage the IDS components The IDS model is relatively simple. Using the built-in configuration interface, a network administrator sets rules for network users with the algorithm construction component. These rules would vary according to the role of each account holder: general user versus system administrator or functional analyst versus senior manager. Rules can be based on a variety of theories:
  Threshold Barriers—a specific event, such as a failed login, happens several times. Or the threshold could be based on something finite, such as bandwidth, which may be eaten up quickly during a denial-of-service attack.
  Profiling—user activity or network use is recorded and analyzed statistically to create a baseline usage profile. When the actual usage profile deviates from the baseline, the deviation should be investigated.
  Known Attack Signatures—data packets or network activities are screened to look for things like invalid TCP headers, sudden mass emails from multiple users, or TCP scans on servers.

IDS applications often provide specific automated responses for rule infractions: flags and warnings for system administrators, automatic user privilege suspensions, automatic email or pager notifications, or a simple but specific notation in a log. Once the network administrator has set these rules and the IDS is fully deployed, the IDS will begin logging network usage and initiate action as defined in the rules. It will also generate log summaries and reports based on input from the automated log review tool. These reports are instrumental in creating a more accurate picture of network usage, which will allow for more appropriate rule creation, an increased ability to plan for future network usage, and a refined ability to predict and counter network attacks.

While an IDS is relatively simple, it does have shortcomings.

Variants: signatures are developed in response to new vulnerabilities or exploits which have been posted or released. Integral to the success of a signature, it must be unique enough to only alert on malicious traffic and rarely on valid network traffic. However, exploit code can often be easily changed. It is not uncommon for an exploit tool to be released and then have its defaults changed shortly thereafter by the hacker community.

False positives: a common complaint is the amount of false positives an IDS will generate. Developing unique signatures is a difficult task and often times the vendors will err on the side of alerting too often rather than not enough. This is analogous to the story of the boy who cried wolf. It is much more difficult to pick out a valid intrusion attempt if a signature also alerts regularly on valid network activity. A difficult problem that arises from this is how much can be filtered out without potentially missing an attack.

False negatives: detecting attacks for which there are no known signatures. This leads to the other concept of false negatives where an IDS does not generate an alert when an intrusion is actually taking place. Simply put if a signature has not been written for a particular exploit there is an extremely good chance that the IDS will not detect it.

Data overload: another aspect which does not relate directly to misuse detection but is extremely important is how much data can an analyst effectively and efficiently analyze. That being said the amount of data he/she needs to look at seems to be growing rapidly. Depending on the intrusion detection tools employed by a company and its size there is the possibility for logs to reach millions of records per day.

System Resources: implementing an IDS will require significant dedicated resources. Consider the gigabytes of system data that can be logged and the processing power required to generate logs, compare all network usage to programmed rules, and respond to anomalous network activity.

Personnel Resources: even with automated tools, large networks require personnel dedicated to following up on IDS alerts, maintaining IDS equipment (including patches and upgrades), and formulating IDS rules based on current and future requirements.

Given the potentially huge corporate liability and exposure to lost profits coming from Internet threats, traditional security systems with an IDS are far from being able to eliminate the complex, blended cyber attacks that business face today. At the same time, deploying and managing in-house security systems, hiring and training IT professionals with security expertise and integrating and maintaining heterogeneous systems has become cost prohibitive for many companies. Consequently, managed security services are providing security for a number of companies. Managed care services provide a security audit for the client, facilitate security enhancements to the clients network and install equipment allowing for the remote provision of IDS services. Managed security services need to maintain a critical staff of expertise dedicated to following up on IDS alerts. For example, a typical security system can log over 100,000 attacks per day resulting in 1000 alerts per day requiring analysis. At 10 minutes per alert, a Tier One analysis staff requires approximately 6 trained employees. The process of analysis is tedious and subject to human error. The Tier One alerts are filtered to approximately 40 Tier Two alerts which analyzed at a rate of approximately 3.5 alerts per hour requiring by a staff of two Tier Two analysis personnel. The Tier Two staff send the client up to two alerts per day which may be legitimate threats requiring a response by an IT professional in accordance with the client's incident response plan. It is desirable to reduce the number of Tier One employees needed to maintain managed security services. This not only removes the human error component of the Tier One filtering, but also reduces the cost of the service. It is consequently desirable to reduce the number of false positives, false negatives, personnel resources and system resources needed to implement an IDS.

Given the large number of attacks that may be experienced by a client, it is desirable to determine if the attack is a general attack or a specific attack directed at the particular client. A general attack on a client may be the result of a worm residing in multiple source hosts generally attacking multiple target networks on the Internet. Such attacks are typically defended against by a well maintained network security system. However, a specific attack may be a hacker or other organization targeting a single specific client. A general attack may require a first type of response while a specific attack may indicate that a more urgent response is appropriate. Thus, what is needed is a way to determine if a client is experiencing an attack that is general in nature or if it is a specific targeted attack.

SUMMARY OF THE INVENTION

One embodiment of the present invention provides a computer network intrusion detection system that includes an intrusion alert generator for detecting external attacks upon a computer network, an analyzer coupled to said intrusion alert generator for analyzing each detected attack and determining a characteristic indicative of each attack, and an adaptive filter coupled to said analyzer for generating an alert based upon characteristics of a plurality of attacks.

Another embodiment of the present invention provides a method of generating a network intrusion alert for a first network coupled to a multiple client network system. The method includes the steps of determining a characteristic of an attack upon the first network, determining if the characteristic matches a characteristic of an attack upon a second client coupled to the multiple client network system, and generating a first alert in response to an absence of the match.

A further embodiment of the present invention provides a method of preempting an intrusion. The method includes the steps of determining characteristics of an attack upon a first host, and testing a second host for susceptibility to an attack of the determined characteristics.

BRIEF DESCRIPTION OF THE DRAWINGS

FIG. 4 shows a process flow operating in an Edge Manager process of a Managed Security Service provider.

FIG. 5 shows a process flow diagram of a process for performing a preemptory vulnerability test in response to a new attacking process found on the edge network.

DETAILED DESCRIPTION OF PREFERRED EMBODIMENTS

Figure 1:
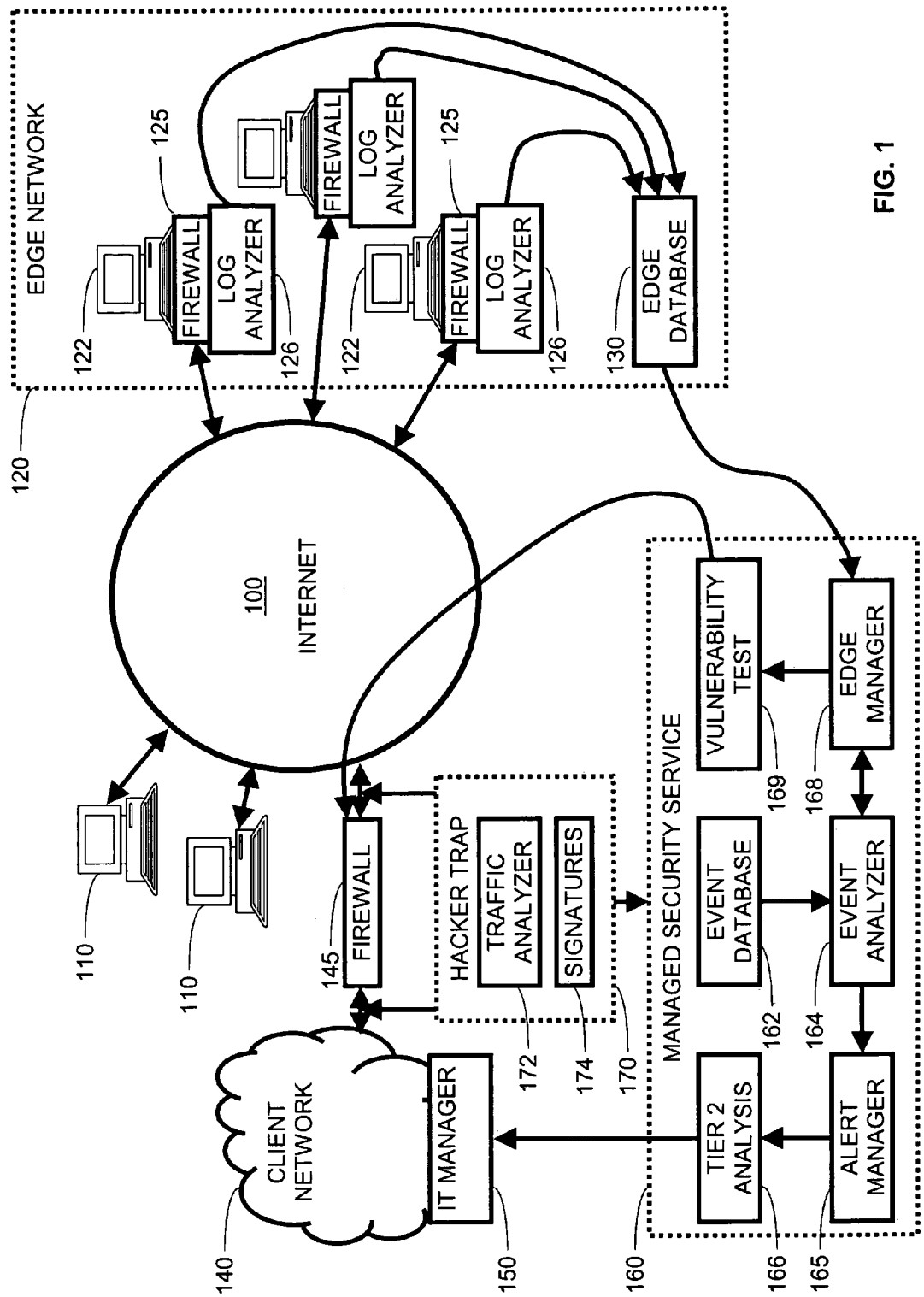
FIG. 1 shows a system block diagram of a network system incorporating the invention.

FIG. 1 shows a system block diagram of a network system incorporating the present invention. The Internet 100 is an example of a multiple client network, other multiple client networks known to those familiar with the art are also anticipated. The clients or hosts are illustrated as individual personal computers 110, but a client could be any device or set of devices coupled to the Internet including private networks, internal networks, local area networks or wide area networks. Clients and their corresponding networks are subject to various attacks from other sources coupled to the Internet, since a multitude of clients coupled to the Intranet have no security or substantial security holes. Such clients are typically home personal computer systems coupled to the Internet via DSL or cable modems. These clients are ripe for harboring processes which attack other more protected clients. Such processes include worms, Trojan horses, viruses and scripts or other attacking or intruding processes released by hackers or other organizations. Clients infected with attacking processes form a platform for launching attacks against other clients. Protected clients may have various levels of protection against such attacks including the aforementioned firewalls and intrusion detection systems.

Some clients in FIG. 1 are shown being members of an edge detection network 120. Each client or sensor 122 in the edge detection network includes a firewall 125 and a log analyzer 126 for analyzing attacks upon the firewall 125. The attacks are communicated to and maintained in an edge database log 130. Edge networks are known to those familiar with the art and include the edge network. A network of this type having fourteen thousand clients can log over five million events per day. This is useful in detecting the progress of worms or other attacking process released upon clients coupled to the Intranet. The edge network database is to report attacks to the responsible party and their Internet service provider in order that corrective action may be taken at the source or the ISP of the source. Clients of a managed security service, to be described in more detail below, may be included as members of the edge network or supplement information provided by the edge network.

On the left side of FIG. 1 is shown a client network 140. The client network may include a mail server, a router or switch or combinations thereof for coupling various host and server devices. The client network is coupled to the Internet by a firewall 145. The firewall blocks unauthorized access between the client network 140 and the Internet 100. The client network also has an IT manager 150 which implements and maintains the client network along with various Internet access policies and responds to various attacks or intrusions.

A managed security service 160 such, as the service provided by SECNAP Network Security, LLC, is shown supporting the client network 140. The managed security service typically provides intrusion detection services to a number of client networks (not shown). The managed security service 160 provides a firewall monitor 170, or HackerTrap™, which monitors traffic between the firewall 145 and the Internet 100 and the firewall 145 and the client network 140. The Hacker-Trap includes a traffic analyzer 172 known to those familiar with the art, such as the process called "SNORT" (see snort.org for details). In an exemplary system, firewall 145 protecting a client network 140 may log 100,000 events per day. The events are generated in response to the signatures and other rules 174. Of those events, the traffic analyzer 170 will communicate 1000 alert events to the managed security service 160. The security service includes an event database 162 for tracking the events received from the HackerTrap 170. The event analyzer 164 is an automated adaptive filtering process replacing the aforementioned manual process of Tier One filtering. The event analyzer 164 looks for trends in the events and generates a reduced number of alerts 165 for the Tier Two manual analysis 166. Tier Two analysis sends important alerts to the IT manager 150 of the client network 140.

The firewalls 125 form second intrusion alert generators for detecting attacks on second networks which are typically separate from the client network. The managed security service also includes an edge manager 168 coupled to the alert generators in the edge network 128 which performs at least two functions, determining if an attack on the client network is a general attack or a specific attack targeting the client network, and running a vulnerability test 169 upon the client network upon detection of a new attacking process. The edge manager makes these determinations using information from the aforementioned edge database. For example, if the event analyzer 164 detects a new attack on the client network 140, and if the edge manager 168 determines the attack is also being experienced by other clients on the edge network 120, then the attack is a general attack. However, if the attack on the client network 140 is not experienced by a significant number of clients on the edge network 120, then the attack is specific to the client network 140 and a more urgent alert may be communicated to the IT manager 150 of the client network. In another example, if the edge network detects a new attack not matching previous signatures, then a new attack signature is generated and the managed security system launches a vulnerability test against the client network. If the client network is vulnerable, then the IT manager can be notified of the vulnerability prior to being attacked by the new process.

Figure 2:
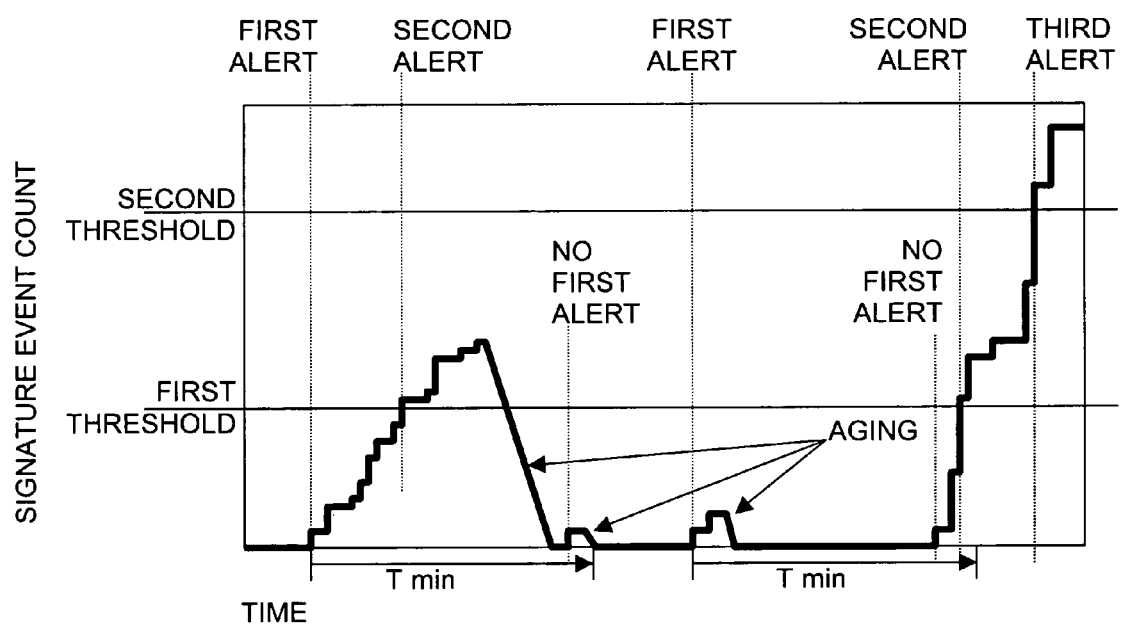
FIG. 2 shows a process of generation of first, second and third categories of alerts.
Figure 3:
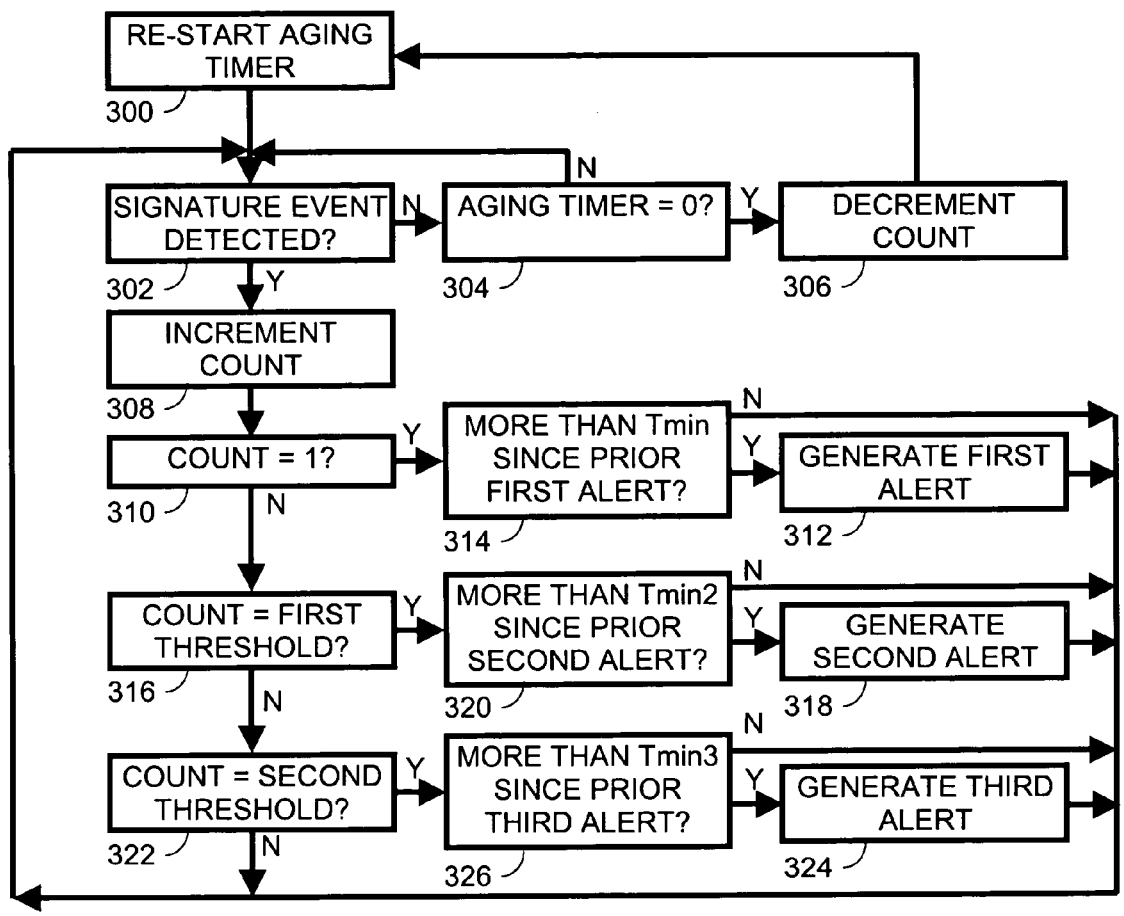
FIG. 3 shows a process flow chart for implementing a Tier One filter.

The tier one filter is provided by the managed security service. The managed security service 160 can receive a large volume of alerts from a multiplicity of HackerTraps 170 of its multiple clients and corresponding networks 140. If a thousand alerts per day were received from the HackerTraps, the aforementioned Tier One filtering service could reduce those alerts to forty Tier Two alerts. FIG. 2 and FIG. 3 illustrate an automated filtering process that performs the Tier One filtering process. FIG. 2 shows a graph of the number of events occurring on a particular signature and is thus illustrative of a plurality of attacks having a common characteristic. FIG. 3 shows a flowchart implementing the filtering process shown in FIG. 2. The signature could detect an attack upon a predefined port having a payload including the term "credit" for example. FIG. 2 shows a graph representative of four hundred events for example, occurring on the signature within a predetermined time of say seventy-two hours. With an optional Tmin filter, FIG. 2 shows the four hundred Tier One alerts result in five-Tier Two alerts (as shown at the top of the graph of FIG. 2).

FIG. 2 shows a process for generation of first, second and third category of alert signals of FIG. 1. The first alert signal indicates new activity on the signature, the second alert signal indicates a moderate activity rate while the third alert signal indicates an exceedingly high event activity rate. The first alert of FIG. 2 is generated upon a first or new occurrence of the signature event or attack characteristic. Subsequent events are accumulated but not alerted until a first threshold is exceeded. A second alert signal is generated indicative of the first threshold being exceeded. The accumulated alerts are subject to an aging criterion which in the example of FIG. 2 brings the accumulation again to zero.

After returning to zero, an occurrence of a subsequent signature event brings the accumulation from zero to one, however since the first alert was generated in less than an amount of time equal to Tmin, a subsequent first alert is not generated. Aging returns the accumulation to zero. An occurrence of a subsequent signature event brings the accumulation to a non-zero value, and since more than a predetermined Tmin amount of time has elapsed since a prior first alert, another first alert signal is generated. Aging again brings the accumulation to zero. A rapid increase in events on the signature occurs at the end of the graph of FIG. 2. While no first alert is generated because the predetermined time Tmin has not elapsed since the prior first alert, a second alert is generated when the first threshold is crossed. Then a third alert is generated when the second threshold is crossed by the value in the accumulator. When combined with aging, the third alert is generated in response to an increase in rate or frequency of attacks of that characteristic exceeding a predetermined rate or frequency. Other methods of determining the rate or frequency of events known to those familiar with the art are also anticipated. Furthermore, the predetermined rate or frequency may be varied deterministically as deterministic variations of thresholds are known to those familiar with the art.

Thus, the four hundred signature events from the Hacker-Trap have been reduced to five alerts for consideration by Tier Two personnel. Note that if the Tmin function were removed, then two additional first alerts would be generated. Thus, the system described advantageously reduces false positives, data overload, and personnel resource required for intrusion detection systems described in the aforementioned background.

FIG. 3 shows a process flow chart for implementing the Tier One filter. First, an aging timer is initialized 300, to a value of fifteen minutes for example. The process then waits for either a signature event 302 to occur or for the aging timer to time out 304. Upon the timing out of the time, the value in the accumulator associated with the signature is decremented 306. The accumulator does not decrement below zero. If a signature event is detected 302, then the count is incremented 308. If the count equals one 310, then the first alert is generated 312 unless the optional step of determining if a time less than Tmin since the generation of the last previous first alert 314. This optional step 314 limits the rate or frequency at which first alerts are generated. If the count equals the first threshold 316, then the second alert is generated 318 unless the optional step of determining if a time less than Tmin1 since the generation of the last previous second alert 320. This optional step limits the rate or frequency at which second alerts are generated. If the count equals the second threshold 322, then the third alert is generated 324 unless the optional step of determining if a time less than Tmin2 since the generation of the last previous third alert 326. This optional step limits the rate or frequency at which third alerts are generated.

The process flow of FIG. 3 shows a process incorporating multiple predetermined thresholds for alert generation with aging. The process has the advantage of implementing the Tier One filter with a single accumulator per signature. This results in a flat file which has the advantage of filtering alerts while conserving memory. Memory could otherwise grow quite large considering that each host has potentially over sixty five thousand ports, each port representing a characteristic or signature of an attack, and the service manager may provide security for networks having hundreds or thousands of host computers. Furthermore, the conservation of memory facilitates rapid processing of a very large number of attacks upon the host computers, thereby advantageously conserving system resources.

It should be appreciated that the thresholds of FIG. 3 may be modified or tuned in accordance with the requirements of the client network. For example, the first alert may be generated in response to a different threshold greater than one. The thresholds of the figure and the number of alert types may be varied in accordance with the needs of the system. Furthermore, the Tmin, Tmin2 and Tmin3 processes can be eliminated to conserve memory and processing requirements. Aging is shown as decrementing the accumulator at a predetermined interval, which may be varied and in accordance with the needs of the client network. The intervals and thresholds may further be dynamic and varied in response to other variables. Furthermore, the method of aging may be varied. For example, the accumulator value could be periodically reset or divided by two, once a day for example. In alternate embodiments, aging may take other forms known to those familiar with the art. Although the example shows an accumulator having an aging characteristic or a decay rate, other methods of determining the frequency or rate of an event are anticipated. Furthermore, alerts may be generated in response to a rate of change of frequency of events.

In the example of FIG. 2, there are a first large number of attacks followed by a second larger number of attacks with small sporadic attacks in between. In a conventional system with manual Tier One review, after determining the attack to be relatively benign, the system may be manually "tuned" after the first large number of attacks by turning the signature off. Thus, subsequent attacks having the signature would not be received by the Tier One group for manual review. Consequently, the second attack on the client system would be totally missed by the conventionally managed security service provider, resulting in a false negative. However, the improved system of FIG. 2 and FIG. 3 not only facilitates the elimination of a significant number of manual Tier One reviews, but further provides for more meaningful alerts. The five alerts generated in the example of FIG. 2 are analyzed by the Tier Two personnel, who may perform a detailed investigation of the attack after the initial "second alert" and may notify the IT manager in response to the initial "third alert" in order that an appropriate response may be taken.

The edge network adds additional intrusion detection capabilities by allowing an attack on a client network to be distinguished between a general attack on multiple clients on the network or a specific attack directed at the particular client. Furthermore, the edge network allows for the determination of new attack processes prior to an attack upon a client network in order that the vulnerability of the client network may be ascertained and preemptive measures taken.

FIG. 4 shows a process flow operating in the Edge Manager process of the Managed Security Service provider 160 of FIG. 1. An alert is received by the edge manager process 400. The alert is preferably generated by the process of FIG. 3. The alert is compared with alerts stored in the edge database 402. If the characteristics are similar 404, then the attack is determined to be a general attack and treated accordingly 406. A general attack may be generated by a worm process residing in a number of source hosts coupled to the Internet attempting to attack a number of target hosts coupled to the Internet. General attacks may have one or more characteristics indicative of a general attack. These characteristics include attacks on multiple sources, multiple targets, and/or multiple ports. An attack is determined to be a specific attack in the absence of characteristics indicative of a general attack 408. Client specific attacks preferably receive more urgent treatment because of the more invidious nature of the attack. By comparing the characteristic of attacks upon a client network with those of the edge network, it can be determined if the attack is general or specific and the priority of the alert adjusted accordingly. The invention's ability to quickly and automatically identify and alert a specific attack has significant advantages in intrusion detection and corresponding responses in protecting the client network.

For example, a general attack would consist of a self-propagating worm, whose payload may just be a process that propagates itself, or may be a payload that allows a hacker or group of hackers remote access to the victim computer. This type of attack may be judged to be of lower priority since it is not an attack directed towards the client network, but an attack based on some linear or random scan algorithm. While this is a lower priority attack, it should still be included in alerts since a client network may be susceptible to this type of attack.

In an example of modality, a client receives a web-based attack on the web server, and the IDS captures the source ip and the attack type. Normal Incident response policies might require that the Tier 1 manager decide, based on that one attack, or multiple attacks against their own network if that is an attack directed toward them or a general attack. Without external correlation this determination can only be made based on a 'guess' that a common attack type is in fact a general attack or worm. With the edge network, this information can be verified by comparing and correlating the source ip with other edge based sensors on the Internet. If this source ip address shows up in the edge database and has been recorded by several different target networks then a reasonable assumption can be made that this is a general attack on the Internet. Individual Incident Response procedures may allow this attack type to be given a lower priority, or the client may just relay on the automated procedures on the edge network to notify the administrator of the source network.

On the other hand, if after recording the source of the attack, the Tier 1 technician is unable to find a correlation between the source ip and additional targets, he can make the assumption that either his ip space is at the beginning of the attack, or this attack is directed towards his network: EVEN IF THIS LOOKS LIKE A COMMON WORM, Hackers may have modified the original worm slightly and use it to map out the clients network and vulnerabilities. This type of attack should be given a higher priority by the Tier 1 technicians and either additional monitoring of that source ip need to be made, or they need to take measures to block that source ip address from further network access.

FIG. 5 shows a process flow diagram of a process for performing a preemptory vulnerability test in response to a new attacking process found on the edge network. Note that the edge network may include clients or client networks of the Managed Security Service. The computer hosts on the edge network are also referred to as sensors. If a new attack process is detected by one or more edge sensors 502, then the process determines if the clients or client networks may have a similar vulnerability 504. This is done in two steps. First, the process tests each client's network to see if they may have a corresponding service running, either exposed to the Internet or used internally. The client point of contact is then notified of new suspicious traffic on the Internet, and given a list of his own servers to monitor. Second, monitoring is set up for these specific services to record information about the attack. If a client attack is captured, an appropriate alert is generated and a corresponding signature created and then distributed to all the client's traffic analyzers 506. Then a vulnerability test is developed 508 and the client is tested 510. This is preferably done by capturing the attacking process and removing any harmful payload from its header prior to exposure to the client network. This process has the advantage of determining if a client is vulnerable to a new attacking process prior to being attacked by the process 512. The attack is found by network sensors prior to an attack on the client. Once the attributes of the attacking process are determined, the client's network can be tested for vulnerability to the attack. The client's network can be secured prior to intrusion 514. Thus, the edge network and the managed security service provide for intrusion preemption to new attacking process released on the Internet 516.

FIG. 5 shows a process flow a second intrusion alert generator of the edge detection network that detects attacks upon a second edge network wherein said adaptive filter is coupled to said second intrusion alert generator and the predetermined rate or frequency is determined in response to a frequency or rate of attacks having the new characteristic upon the second network.

In an example of an SQL Snake worm, several individual edge sensors would begin to pick up an increase in traffic targeting the Microsoft SQL Service. These sensors then send this data to the edge database where the process began to monitor it. At this point, there would be just one source network generating the scans and it could be an individual hacker or a misconfigured client. Later, edge sensors would pick up additional source networks, some of which would report being scanned. These network sources then create additional scans which infect other systems which create additional scans. The process then determines that there is in fact what looks like a self propagating worm. The HackerTrap then does its own scans of the clients' network and informs each administrator of any systems that may be running SQL server and warns them that there is an unknown worm or attack targeting SQL Server. The process then attempts to capture a copy of the worm through increasing logging of traffic to the SQL Servers. Prior to capturing the attacking process it has been identified and a security bulletin released. Client networks are tested for this vulnerability prior to the worm reaching their network and are able to mitigate the damage done by restricting access to the server until the vendor could provide a patch or workaround. In the SQL-Snake worm example, it was a matter of days before Microsoft was able to create a patch and damage to client's networks was avoided.

Another example is the detection of increased scanning from several different network sources to several different network targets for a remote control administrative service called 'radmin' from famatech (radmin.com). In response, the clients would be informed that they need to take additional steps to secure their radmin enabled computers and avoid compromise.

Thus, what is described is an improved intrusion detection system with enhanced alert filtering, general vs. specific attack determination and intrusion preemption capabilities. The managed security service not only has the advantage of reduced false positive and negative alerts, but also reduces data overload and the need for systems resources and personnel resources, while providing intrusion preemption for new attacking processes. The information above and attached appendices describe embodiments of the present invention. Is should be appreciated that modifications and alterations may be made to the description provided herein without departing from the spirit and scope of the invention.

What is claimed is:

1. A computer network intrusion detection system comprising:

a plurality of different log analyzers for different external networks, each log analyzer being configured for detecting attacks upon a firewall in an corresponding one of the different external networks defining an edge detection network;

an edge database log coupled to the different log analyzers logging attacks upon the different external networks;

an intrusion detector coupled to a client network and configured to detect external attacks upon the client network;

an analyzer coupled to said intrusion detector for analyzing each detected attack and determining a characteristic indicative thereof to classify each detected attack as a general attack or a client specific attack based upon logged attacks in the edge database log; and, a filter coupled to said analyzer for generating an alert based upon characteristics of a plurality of attacks;

a second intrusion detector for detecting external attacks upon a second computer network; and, a second analyzer coupled to said second intrusion detector for analyzing each detected attack upon the second network and determining a characteristic indicative thereof, wherein said filter is further coupled to said second analyzer and further compares the attack characteristics determined by said analyzer and said second analyzer and generates a specific attack alert in response to a substantial absence of similarity in the comparison.

2. The system according to claim 1 further comprising an alert generator for generating an alert indicative of the specific attack on the one of the networks experiencing the attacks having the absence of similarity of attacks on the other of the networks.

3. The system according to claim 1 further comprising: a vulnerability tester coupled to said filter for testing the one of the networks not experiencing the attacks for a vulnerability to the attack characteristic experienced by the other of the computer networks.

4. A method of generating a network intrusion alert for a first network coupled to a multiple client network system comprising the steps of:

logging attacks on multiple different external networks defining an edge detection network;

detecting an attack on a client network;

classifying the attack as either a general attack or a client specific attack by comparing the attack to attacks logged for the edge detection network;

prioritizing handling of the detected attack if the attack is classified as a general attack;

generating a first alert in response to an absence of a match between the attack and the attacks logged for the edge detection network, wherein the first alert is indicative of a client specific attack on the first network; and generating a second alert in response to a presence of a match between the attack and the attacks logged for the edge detection network, wherein the second alert is indicative of a general attack on the first network.

* * * * *